(12) United States Patent
Bai et al.

(10) Patent No.: US 11,608,457 B2
(45) Date of Patent: Mar. 21, 2023

(54) TWO-COMPONENT SOLVENTLESS ADHESIVE COMPOSITIONS AND METHODS OF MAKING SAME

(71) Applicants: DOW GLOBAL TECHNOLOGIES LLC, Midland, MI (US); ROHM AND HAAS COMPANY, Philadelphia, PA (US)

(72) Inventors: Chenyan Bai, Shanghai (CN); Mai Chen, Chicago, IL (US); Yinzhong Guo, Pearland, TX (US); Joseph J. Zupancic, Glen Ellyn, IL (US); Amira A. Marine, Missouri City, TX (US)

(73) Assignees: Dow Global Technologies LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 1020 days.

(21) Appl. No.: 16/334,646

(22) PCT Filed: Sep. 19, 2016

(86) PCT No.: PCT/CN2016/099304
§ 371 (c)(1),
(2) Date: Mar. 19, 2019

(87) PCT Pub. No.: WO2018/049672
PCT Pub. Date: Mar. 22, 2018

(65) Prior Publication Data
US 2021/0284886 A1 Sep. 16, 2021

(51) Int. Cl.
| | |
|---|---|
| *C09J 175/06* | (2006.01) |
| *C08G 18/12* | (2006.01) |
| *C08G 18/40* | (2006.01) |
| *C08G 18/42* | (2006.01) |
| *C08G 18/48* | (2006.01) |
| *C08G 18/50* | (2006.01) |
| *C08G 18/72* | (2006.01) |
| *C08G 18/76* | (2006.01) |
| *C08G 18/78* | (2006.01) |
| *C09J 175/08* | (2006.01) |

(52) U.S. Cl.
CPC ............ *C09J 175/06* (2013.01); *C08G 18/12* (2013.01); *C08G 18/4018* (2013.01); *C08G 18/4216* (2013.01); *C08G 18/4238* (2013.01); *C08G 18/4825* (2013.01); *C08G 18/4841* (2013.01); *C08G 18/5084* (2013.01); *C08G 18/725* (2013.01); *C08G 18/7657* (2013.01); *C08G 18/7843* (2013.01); *C09J 175/08* (2013.01); *C08G 2170/00* (2013.01); *C08G 2390/00* (2013.01); *C09J 2301/162* (2020.08); *C09J 2475/00* (2013.01)

(58) Field of Classification Search
None
See application file for complete search history.

(56) References Cited

U.S. PATENT DOCUMENTS

| | | | |
|---|---|---|---|
| 5,418,054 | A | 5/1995 | Sun |
| 6,552,159 | B1 | 4/2003 | Shiraiwa et al. |
| 7,297,748 | B2 | 11/2007 | Trivedi |
| 8,022,164 | B1 | 9/2011 | Wu et al. |
| 10,155,890 | B2 | 12/2018 | Vietti et al. |
| 10,233,368 | B2 | 3/2019 | Laferte et al. |
| 2013/0273383 | A1 | 10/2013 | Craun et al. |
| 2017/0226391 | A1* | 8/2017 | Vietti ................. C08G 18/5081 |

FOREIGN PATENT DOCUMENTS

| | | |
|---|---|---|
| CN | 101580579 | 4/2011 |
| CN | 103013417 | 5/2014 |
| CN | 104403623 | 3/2015 |
| WO | 2015/168670 | 11/2015 |

OTHER PUBLICATIONS

PCT/CN2016/099304, International Search Report and Written Opinion dated Jun. 9, 2017.
PCT/CN2016/099304, International Preliminary Report on Patentability dated Mar. 19, 2019.

* cited by examiner

Primary Examiner — Jeffrey D Washville

(57) ABSTRACT

The present disclosure provides a two-component solventless adhesive composition comprising a polyol component and an isocyanate component. The polyol component comprises a phosphate functional compound, and at least one polyol selected from polyester, polyether, and the combination thereof; and the isocyanate component comprises isocyanate prepolymer that is the reaction product of at least one isocyanate monomer and at least one polyol selected from polyester, polyether, and the combination thereof.

12 Claims, No Drawings

TWO-COMPONENT SOLVENTLESS ADHESIVE COMPOSITIONS AND METHODS OF MAKING SAME

FIELD OF THE DISCLOSURE

The present disclosure relates to solventless adhesive compositions. More particularly, the disclosure relates to two-component solventless adhesive compositions for use with laminate films having improved bond strength, chemical resistance, and heat seal strength, and methods of making the same.

BACKGROUND AND SUMMARY OF THE DISCLOSURE

Adhesive compositions are useful for a wide variety of purposes. For instance, adhesive compositions are used to bond together substrates such as polyethylenes, polypropylenes, polyesters, polyamides, metals, papers, or cellophanes to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to 100% solids without either organic solvents or aqueous carriers. Because no organic solvent or water has to be dried from the adhesive upon application, these adhesives can be run at high line speeds and are preferable in applications requiring quick adhesive application. Solvent-based and water-based laminating adhesives are limited by the rate at which the solvent or water carrier can be effectively dried and removed upon application. For environmental, health, and safety reasons, laminating adhesives are preferably aqueous or solventless.

Within the category of solventless laminating adhesives, there are many varieties. One particular variety includes two-component polyurethane-based laminating adhesives. Typically, a two-component polyurethane-based laminating adhesive includes a first component comprising an isocyanate-containing prepolymer and a second component comprising one or more polyols. The first component is obtained by the reaction of an isocyanate monomer with a polyether polyol and/or polyester polyol. The second component is a polyether polyol and/or a polyester polyol. Each component can optionally include one or more additives. The two components are combined in a predetermined ratio and applied on a film/foil substrate, which is then laminated to another film/foil substrate.

Two-component solventless polyurethane-based laminating adhesives, compared to traditional solvent-containing adhesives, include weak initial bonds and slow bond development before the laminate can be processed. In addition, these adhesives tend to exhibit relatively poor chemical resistance, especially in acidic conditions. In some instances, a silane adhesion promoter is incorporated in the adhesive composition to improve bond strength. However, silane adhesion promoters cannot withstand acid resistance, and the bond strength of the adhesive composition suffers after acid treatment. Further, laminates incorporating silane adhesion promoters require dry storage environments because silane is sensitive to moisture.

Therefore, two-component solventless polyurethane-based laminating adhesive compositions with improved bond strength, chemical resistance, and heat seal strength, and methods of making the same, are desirable.

The present disclosure provides a two-component solventless adhesive composition comprising a polyol component and an isocyanate component.

The polyol component comprises a phosphate functional compound, and at least one polyol selected from polyester, polyether, and combinations thereof; and the isocyanate component comprises an isocyanate prepolymer that is the reaction product of at least one isocyanate monomer and at least one polyol selected from polyester, polyether, and the combination thereof.

The present disclosure further provides an adhesive composition that is the curing reaction product of the polyol component and the isocyanate component.

The present disclosure further provides a laminate film comprising a layer of the adhesive composition.

DETAILED DESCRIPTION OF THE DISCLOSURE

The two-component solventless adhesive composition according to this disclosure comprises a polyol component and an isocyanate component.

Polyol Component

The solventless adhesive composition comprises at least one polyol component comprising a phosphate functional compound, and at least one polyol selected from the group consisting of a polyester polyol, a polyether polyol, and the combination thereof.

A compound with two or more hydroxyl groups is a "polyol." A polyol with exactly two hydroxyl groups is a "diol." A polyol with exactly three hydroxyl groups is a "triol."

A compound that contains two or more ester linkages in the same linear chain of atoms is known herein as a "polyester." A compound that is a polyester and a polyol is known herein as a "polyester polyol." Polyester polyols suitable for use in the polyol component have a molecular weight not to exceed 4,000 g/mol. In addition, the disclosed polyester polyols have a hydroxyl group functionality of at least 1.5 and not to exceed 3 (i.e., 1.5≤f≤3).

Polyester polyols suitable for use according to this disclosure include, but are not limited to, polycondensates of diols and also, optionally, polyols (e.g., triols, tetraols), and of dicarboxylic acids and also, optionally, polycarboxylic acids (e.g., tricarboxylic acids, tetracarboxylic acids) or hydroxycarboxylic acids or lactones. The polyester polyols can also be derived from, instead of the free polycarboxylic acids, the corresponding polycarboxylic anhydrides, or corresponding polycarboxylic esters of lower alcohols.

Suitable diols include, but are not limited to, ethylene glycol, butylene glycol, diethylene glycol, triethylene glycol, polyalkylene glycols, such as polyethylene glycol, and also 1,2-propanediol, 1,3-propanediol, 1,3-butanediol, 1,4-butanediol, 1,6-hexanediol, and neopentyl glycol. In order to achieve a polyester polyol functionality greater than 2, polyols having a functionality of 3 can optionally be included in the adhesive composition (e.g., trimethylolpropane, glycerol, erythritol, pentaerythritol, trimethylolbenzene or trihydroxyethyl isocyanurate).

Suitable dicarboxylic acids include, but are not limited to, aliphatic acids, aromatic acids, and combinations thereof.

Examples of suitable aromatic acids include phthalic acid, isophthalic acid, terephthalic acid, and tetrahydrophthalic acid. Examples of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Further, monocarboxylic acids, such as benzoic acid and hexane carboxylic acid, should be minimized or excluded from the disclosed compositions. Saturated aliphatic and/or aromatic acids are also suitable for use according to this disclosure, such as adipic acid or isophthalic acid.

The amount of the polyester polyol in the polyol component is, by weight based on the weight of the polyol component, at least 0.05 wt %, or at least 5 wt %, or at least 8 wt %. The amount of the polyester polyol in the polyol component is not to exceed, by weight based on the weight of the polyol component, 100 wt %, or 90 wt %, or 80 wt %.

A compound that contains two or more ether linkages in the same linear chain of atoms is known herein as a "polyether." A compound that is a polyether and a polyol is a "polyether polyol." Polyether polyols suitable for use in the polyol component have a molecular weight not to exceed 5,000 g/mol. In addition, the disclosed polyether polyols have a hydroxyl group functionality of at least 1.5 and not to exceed 3 (i.e., 1.5≤f≤3).

Polyether polyols suitable for use according to this disclosure are the polyaddition products of ethylene oxide, propylene oxide, tetrahydrofuran, butylene oxide, and the co-addition and grafted products thereof, as well as the polyether polyols obtained by condensation of polyhydric alcohols, or mixtures thereof. Examples of polyether polyols suitable for use include, but are not limited to, polypropylene glycol ("PPG"), polyethylene glycol ("PEG"), polybutylene glycol, and polytetramethylene ether glycol ("PTMEG").

The amount of the polyether polyol in the polyol component is, by weight based on the weight of the polyol component, at least 0.05 wt %, or at least 10 wt %, or at least 20 wt %. The amount of the polyether polyol in the polyol component is not to exceed, by weight based on the weight of the polyol component, 100 wt %, or 90 wt %, or 80 wt %.

Phosphate functional compounds suitable for use in the polyol component may be represented by structure I. A phosphate functional compound can be a phosphate functional polyol, which has two or more hydroxyl groups and one or more structure I.

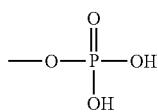

I

Phosphate functional polyols suitable for use according to this disclosure are the reaction products of polyols with polyphosphoric acid. Suitable polyols have molecular weight of at least 90, or at least 200, or at least 400 g/mol. Suitable polyols have molecular weight of not to exceed 4000, or 2000 or 900 g/mol.

In some embodiments, suitable phosphate functional polyols are those that contain a urethane linkage, which are made by reacting a phosphate functional polyol with one or more polyisocyanates or diisocyanates.

The amount of the phosphate functional compound in the polyol component is, by weight based on the weight of the polyol component, at least 0.2 wt %, or at least 0.5 wt %, or at least 2 wt %. In some embodiments, the amount of the phosphate functional compound in the polyol component ranges from 0.2 wt % to 2.0 wt %, or from 0.5 wt % to 1.9 wt %. The amount of the phosphate functional compound in the final polyol component is not to exceed, by weight based on the weight of the polyol component, 10 wt %, or 9 wt %, or 8 wt %. In some embodiments, the amount of the phosphate functional compound in the polyol component ranges from 1.0 wt % to 10.0 wt %, or from 2.0 wt % to 8.0 wt %.

Isocyanate Component

The isocyanate component comprises an isocyanate prepolymer that is the reaction product of reactants (the "prepolymer reactants") comprising at least one isocyanate monomer, at least one polyol selected from the group consisting of a polyester polyol, a polyether polyol, and the combinations thereof. Each of the prepolymer reactants is discussed in detail below.

As used herein, an "isocyanate monomer" is any compound that contains two or more isocyanate groups. An "aromatic isocyanate" is an isocyanate that contains one or more aromatic rings. An "aliphatic isocyanate" contains no aromatic rings.

Isocyanate monomers suitable for use according to this disclosure can be selected from the group consisting of aromatic isocyanates, aliphatic isocyanates, carbodiimide modified isocyanates, and the combinations thereof. Examples of aromatic isocyanates suitable for use according to this disclosure include, but are not limited to, isomers of methylene diphenyl dipolyisocyanate ("MDI") such as 4,4-MDI, 2,4-MDI and 2,2'-MDI, or modified MDI such as carbodiimide modified MDI or allophanate modified MDI; isomers of toluene-dipolyisocyanate ("TDI") such as 2,4-TDI, 2,6-TDI, isomers of naphthalene-dipolyisocyanate ("NDP") such as 1,5-NDI, and combinations thereof. Examples of aliphatic isocyanates suitable for use according to this disclosure include, but are not limited to, isomers of hexamethylene dipolyisocyanate ("HDP"), isomers of isophorone dipolyisocyanate ("IPDI"), isomers of xylene dipolyisocyanate ("XDI"), and combinations thereof.

The amount of the isocyanate monomer in the isocyanate component is, by weight based on the weight of the isocyanate component, at least 10 wt %, or at least 20 wt %, or at least 30 wt %. The amount of the at least one isocyanate in the isocyanate component is not to exceed, by weight based on the weight of the isocyanate component, 80 wt %, or 70 wt %, or 65 wt %.

Compounds having isocyanate groups, such as the isocyanate prepolymer of the isocyanate component, may be characterized by the parameter "% NCO," which is the amount of isocyanate groups by weight based on the weight of the compound. The parameter % NCO is measured by the method of ASTM D 2572-97(2010). The disclosed isocyanate component has a % NCO of at least 3 wt %, or at least 5 wt %, or at least 7 wt %. In some embodiments, the isocyanate component has a % NCO not to exceed 30 wt %, or 25 wt %, or 22 wt %, or 20 wt %.

Suitable examples of polyester polyols are as described above in the polyol component.

The amount of the polyester polyol in the isocyanate component is, by weight based on the weight of the isocyanate component, at least 2 wt %, or at least 5 wt %, or at least 8 wt %. The amount of the polyester polyol in the isocyanate component is not to exceed, by weight based on the weight of the isocyanate component, 45 wt %, or 40 wt %, or 35 wt %.

Suitable examples of polyether polyols are as described above in the polyol component.

The amount of the polyether polyol in the isocyanate component is, by weight based on the weight of the isocyanate component, at least 5 wt %, or at least 10 wt %, or at least 15 wt %. The amount of the polyether polyol in the isocyanate component is not to exceed, by weight based on the weight of the isocyanate component, 45 wt %, or 40 wt %, or 35 wt %.

In some embodiments, the isocyanate component has viscosity at 25° C. of 300 mPa·s to 20,000 mPa·s, as measured by the method of ASTM D2196.

The isocyanate component can, optionally, comprise one or more catalysts. Examples of the at least one catalyst suitable for use according to this disclosure include, but are not limited to, dibutyltin dilaurate, zinc acetate, 2,2-dimorpholinodiethylether, and combinations thereof.

The disclosed isocyanate component may optionally further comprise a phosphate functional polyol. The disclosed phosphate functional polyol can be represented by structure II.

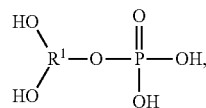

wherein $R^1$ is an organic group.

When optionally included in the isocyanate component, the amount of phosphate functional polyol in the isocyanate component is, by weight based on the weight of the isocyanate component, at least 0.05 wt %, or at least 0.1 wt %, or at least 0.2 wt %. The amount of phosphate functional polyol in the isocyanate component is not to exceed, by weight based on the weight of the isocyanate component, 3 wt %, or 2.5 wt %, or 2.0 wt %. Preferably, it will range from 0.05 wt % to 3.0 wt %, and more preferably from 0.1 wt % to 2.0 wt %.

The disclosed polyol component or isocyanate component may optionally further comprise a bio-based polyol, such as castor oil or other bio-based polyols. The disclosed bio-based polyol has a hydroxyl group functionality of at least 1.5 and not to exceed 4 (i.e., 1.5≤f≤4).

When optionally included in the polyol component, the amount of the bio-based polyol in the polyol component is, by weight based on the weight of the polyol component, at least 0.01 wt %, or at least 0.1 wt %, or at least 3 wt %. The amount of the bio-based polyol in the polyol component is not to exceed, by weight based on the weight of the polyol component, 15 wt %, or 10 wt %, or 5 wt %.

When optionally included in the isocyanate component, the amount of the bio-based polyol in the isocyanate component is, by weight based on the weight of the isocyanate component, at least 0.01 wt %, or at least 0.1 wt %, or at least 3 wt %. The amount of the bio-based polyol in the isocyanate component is not to exceed, by weight based on the weight of the isocyanate component, 15 wt %, or 10 wt %, or 5 wt %.

In some embodiments, the weight ratio of the isocyanate component to the polyol component is 1:1 or higher, or 1.5:1 or higher; or 1.8:1 or higher. In some embodiments, the weight ratio of the isocyanate component to the polyol component is 5:1 or lower, or 4.5:1 or lower, or 4:1 or lower.

It is contemplated that the isocyanate component and the polyol component of the disclosed solventless adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to put it in a liquid state. A layer of the composition is applied to a surface of a film. A "film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture applied to the film is 1 to 5 μm.

In some embodiments, a surface of another film is brought into contact with the layer of the curable mixture to form an uncured laminate. In some embodiments, the uncured laminate is made at a time when the amount of unreacted polyisocyanate groups present in the adhesive composition is, on a molar basis compared to the amount of polyisocyanate groups present in the isocyanate component prior to contact with the polyol component, at least 50%, or at least 75%, or at least 90%. The uncured laminate is further made at a time when the amount of unreacted polyisocyanate groups present in the curable mixture is less than 100%, or less than 97%, or less than 95%.

The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymers, and metal-coated polymers. Films optionally have a surface on which an image is printed with ink; the ink may be in contact with the adhesive composition. In some embodiments, the films are polymer films and metal-coated polymer films, more preferred are polymer films.

EXAMPLES

The present disclosure will now be explained in further detail by Inventive Examples and Comparative Examples (collectively, "the Examples"). However, the scope of the present disclosure is not, of course, limited to the formulations set forth in the examples. Rather, the Examples are merely inventive of the disclosure.

I. Raw Materials

The raw materials used to prepare the Examples are identified in Table 1 below by commercial names and suppliers, and in Table 2 below by components.

TABLE 1

Raw Materials

| Component | Commercial Name | Commercial Supplier |
|---|---|---|
| Isocyanate monomer | ISONATE ™ 50 OP | The Dow Chemical Company |
| | ISONATE ™ 125M | |
| | ISONATE ™ 143L | |
| | LUPRANATE ™ MI | BASF |
| Polyether polyol | VORANOL ™ P1010L | The Dow Chemical Company |
| | VORANOL ™ CP450 | |
| | VORANOL ™ PPG2000 | |
| | VORANOL ™ 232-034 | |
| | ARCOL ™ PPG 425 | Covestro |

Polyester polyols A through D were prepared with the components listed in the following Table 2 utilizing the general preparation process described below.

TABLE 2

Polyester polyols A through D

| Monomers/ Intermediates (g) | Polyester A | Polyester B | Polyester C | Polyester D |
|---|---|---|---|---|
| Adipic acid | 708.38 | 866.70 | 993.68 | 1245.10 |
| Isophthalic acid | 120.27 | 313.20 | — | — |
| Terephthalic acid | — | 193.68 | — | — |
| Diethylene glycol | 771.26 | — | 925.48 | — |
| Ethylene glycol | — | 559.62 | — | — |
| Neopentyl glycol | — | — | — | 462.74 |
| 1,4-Butanediol | — | — | — | 462.74 |
| Trimethylolpropane | — | 190.26 | — | — |
| Tetra n-butyl titanate | 0.06 | — | — | — |
| Stannous chloride | — | 0.02 | 0.02 | 0.02 |

The polyesters are prepared by charging all monomers/intermediates except catalyst (Tetra n-butyl titanate or Stannous chloride) to a 5 Liter reactor. The reactants are heated slowly with stirring under Nitrogen to 225° C. and water is removed from the reactor by distillation. When acid value of resin is ≤20, catalyst is introduced into the reactor with vacuum applied. The reaction conditions are maintained until the acid value ≤1.0 and then resin is cooled to ca. 160° C. and transferred to packaging.

II. Test Methods

Laminate Performance Testing

The Inventive and Comparative Adhesives are then used to form laminates comprising polyethylene and aluminum films. The adhesives are applied to the polyethylene at 2.0 gsm coating weight, brought together with the aluminum film, and then cured at 50° C. for 24 hours to form the laminates. Once the laminate is formed, tests are conducted to analyze the bond strength, heat seal strength, and boil-in-bag resistance with morton soup (a 1:1:1 mixture of Jinlong Fish bean oil, Heinz ketchup and Henshun black vinegar).

1. Bond Strength Test (BS)

The laminates are cut into 15 mm width strips for T-peel testing under 250 mm/min crosshead speed using a 5940 Series Single Column Table Top System available from Instron Corporation. During testing, the tail of each strip is pulled slightly by hand to ensure the tail remains at a 90° angle to the peeling direction. Three strips are tested for each sample and the average value is calculated. Results are in the unit of N/15 mm. Relatively higher values indicate better bond strength.

2. Heat Seal Strength Test (HS)

The laminates are heat sealed in a HSG-C Heat-Sealing Machine available from Brugger Feinmechanik GmbH under 140° C. seal temperature and 300N pressure for 1 second. The laminates are then cooled down and cut into 15 mm width strips for heat seal strength testing under 250 mm/min crosshead speed using a 5940 Series Single Column Table Top System available from Instron Corporation. Three strips are tested for each sample and the average value is calculated. Results are in the unit of N/15 mm. Relatively higher values indicate better heat seal strength.

3. Boil-In-Bag Resistance Test (Bib)

The laminates are cut into 8 cm×12 cm pieces and made into a bag through heat sealing with morton soup inside the bag. The bags are then placed in boiling water and left for 30 minutes, ensuring the bags are always immersed in water during the entire boiling process. The extent of tunneling, de-lamination, and/or leakage of the bags is recorded upon completion of the boiling process. For a sample to pass the boil-in-bag resistance testing, it must show no evidence of tunneling, de-lamination, or leakage. Then bags are then opened, emptied, and cut into 15 mm width strips immediately to test the T-peel bonding strength in INSTRON™ 5943 machine. Three strips are tested to take the average value.

III. Examples

1. Inventive Adhesives 1 to 6 (IAs 1 to 6)

Isocyanate Components A1 to A5 (IC.A1 to IC.A5) are synthesized according to the procedure described below using the raw materials listed in Table 3 in percentage by weight based on total weight of the isocyanate component.

The Isocyanate Components A1 to A5 are synthesized in a 1 L glass reactor according to a typical polyurethane prepolymer preparation process. The isocyanate monomer(s) is introduced into the reactor and maintained at 60° C. with nitrogen protection. Then, the various polyols according to Table 3 are introduced into the reactor. The temperature is slowly increased to 80° C. and maintained for 2 to 3 hours. The produced isocyanate prepolymer, i.e., the isocyanate component, is charged into a sealed container with nitrogen protection for further application.

TABLE 3

Isocyanate Components A1 to A5

| Raw material | IC.A1 | IC.A2 | IC.A3 | IC.A4 | IC.A5 |
|---|---|---|---|---|---|
| ISONATE ™ 50 OP | 50.1 | 50 | 55 | | 58 |
| ISONATE ™ 125M | | | | 36 | |
| ISONATE ™ 143L | | | | 14 | |
| Polyester A | 12 | 12 | 12 | 12 | |
| VORANOL ™ P1010L | | | 23 | | |
| VORANOL ™ PPG2000 | | 28 | | 28 | |
| VORANOL ™ 232-034 | 28.1 | | | | |
| Polyester C | | | | | 42 |
| Polyester D | 9.8 | 10 | 10 | 10 | |
| Total | 100 | 100 | 100 | 100 | 100 |

The Polyol Components B1 to B2 (PC.B1 to PC.B2) are synthesized according to the procedure described below using the raw materials listed in Table 4 in percentage by weight based on total weight of the polyol component.

The Polyol Components B1 to B2 are prepared by introducing the polyols as indicated in Table 4 into a reactor, after the moisture of the polyols are removed and their moisture contents are less than 500 ppm. The polyols are stirred and mixed in the reactor under nitrogen protection.

TABLE 4

Inventive component B formulation information

| Raw material | PC.B1 | PC.B2 |
|---|---|---|
| Polyester B | 30 | 30 |
| VORANOL™ P1010L | 70 | 70 |
| phosphate functional compound* | 3.75 | 5 |

*Phosphate functional compound has the following structure:

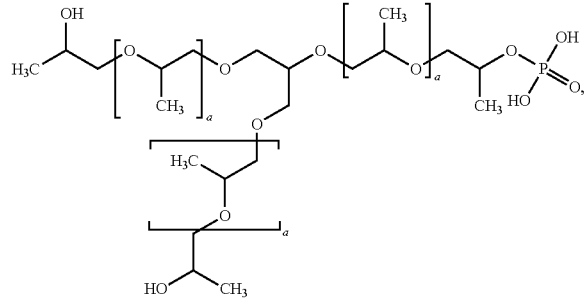

wherein a = 0 to 20.

The Inventive Adhesives 1 to 6 (IAs 1 to 6) are prepared by simply mixing the isocyanate components and polyol components according to the pairings illustrated in Table 5.

TABLE 5

Two-component solventless adhesive compositions

| Examples | Isocyanate and Polyol Component Pairings |
|---|---|
| Inventive Adhesive 1 | IC.A1/PC.B1 |
| Inventive Adhesive 2 | IC.A2/PC.B1 |
| Inventive Adhesive 3 | IC.A3/PC.B1 |
| Inventive Adhesive 4 | IC.A4/PC.B1 |
| Inventive Adhesive 5 | IC.A5/PC.B1 |
| Inventive Adhesive 6 | IC.A3/PC.B2 |

2. Comparative Adhesive 1 (CA 1)

Comparative Adhesive 1 comprises the isocyanate component and the polyol component as prepared utilizing the procedure described below.

590.8 g ISONATE 125M isocyanate and 949.2 g LUPRANATE MI isocyanate are charged to a 5-Liter reactor and the mixture is heated to 55° C. with stirring under Nitrogen. A blend of 711.2 g ARCOL PPG 1025, 294.0 g ARCOL PPG 425 and 254.8 g Polyester polyol A are added to the reaction mixture over a 30 minute interval and maintained at 75° C. during the addition. The reaction mixture is maintained at 75° C. for 3 hours under Nitrogen. The reaction mixture is cooled to ca. 60° C., filtered and packaged. The reaction product is the isocyanate component and has a % NCO of 13.2% and a viscosity at 25° C. of 7000 to 8700 mPa·s.

1050.0 g of Polyester polyol B and 2450.0 g of VORANOL CP450 are charged to a 5-Liter reactor and the mixture is heated slowly to 45° C. with stirring under Nitrogen and then maintained at 45° C. for 1 hour to permit uniform blending of the components. After ca. 1 hour, the mixture is filtered and packaged. The reaction product is the polyol component and has a viscosity at 25° C. of 1700 to 2200 mPa·s.

The prepared isocyanate component and the polyol component are simply mixed to prepare Comparative Adhesive 1.

IV. Results

As shown in Table 6, all Inventive Adhesives exhibit good bond strength and heat seal strength at room temperature, and maintained at least 50% of initial bond strength after boil-in-bag test. However, Comparative Adhesives 1 exhibited decreased bond strength in boil-in-bag (Bib) test.

TABLE 6

Performance Testing Results

| | BS (N/15 mm) | HS (N/15 mm) | Bib (N/15 mm) | Failure mode |
|---|---|---|---|---|
| IE 1 | 9.9 | 47 | 4.5 | cohesive failure |
| IE 2 | 7.9 | 48 | 4.5 | |
| IE 3 | 8.2 | 52 | 5.9 | |
| IE 4 | 9.1 | 49 | 4.6 | |
| IE 5 | 7.7 | 48 | 5.5 | |
| IE 6 | 8.1 | 53 | 6.5 | |
| CE 1 | 5.6 | 58 | 0.3 | adhesive failure |

The invention claimed is:

1. A two-component solventless adhesive composition comprising:
   A. a polyol component comprising:
      a. a phosphate functional compound,
      b. at least one polyester polyol,
      c. and at least one polyether polyol,
   B. an isocyanate component comprising
      a. an isocyanate prepolymer that is the reaction product of:
         i. at least one isocyanate monomer
         ii. at least one polyester polyol, and
         iii. at least one polyether, polyol
      wherein a laminate made with the two-component solventless adhesive has a boil-in bag resistance of at least 4.0 N/15 mm.

2. The composition according to claim 1, wherein the phosphate functional compound comprises structure I:

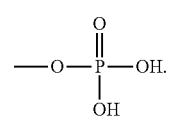

3. The composition according to claim 2, wherein the phosphate functional compound is a phosphate functional polyol comprising two or more hydroxyl groups and one or more structure I.

4. The composition according to claim 3, wherein the phosphate functional polyol is the reaction product of a polyol and a polyphosphoric acid.

5. The composition according to claim 3, wherein the phosphate functional polyol has a molecular weight of at least 90, and not to exceed 4000 g/mol.

6. The composition according to claim 1, wherein the amount of the phosphate functional compound in the polyol component is, by weight based on the weight of the polyol component, at least 0.2 wt %, and not to exceed 10 wt %.

7. The composition according to claim 1, wherein the isocyanate monomer is selected from aromatic isocyanates, aliphatic isocyanates, carbodiimide modified isocyanates, and the combinations thereof.

8. The composition according to claim 1, wherein at least one of the isocyanate component and the polyol component further comprises a bio-based polyol.

9. The composition according to claim 8, wherein the bio-based polyol is castor oil.

10. The composition according to claim 1, wherein the weight ratio of the isocyanate component to the polyol component is from 1:1 to 5:1.

11. An adhesive composition that is the curing reaction product of the polyol component and the isocyanate component according to claim 1.

12. A laminate film comprising a layer of the adhesive composition according to claim 11.

* * * * *